United States Patent [19]

Kubo et al.

[11] Patent Number: 5,059,774

[45] Date of Patent: Oct. 22, 1991

[54] SEEK AND TRACK CONTROL FOR A RECTANGULAR OPTICAL CARD HANDLING APPARATUS

[75] Inventors: Nobuaki Kubo, Urawa; Isamu Shibata, Fuchu, both of Japan

[73] Assignee: Ricoh Company, Ltd., Tokyo, Japan

[21] Appl. No.: 258,693

[22] Filed: Oct. 17, 1988

[30] Foreign Application Priority Data

Oct. 15, 1987 [JP] Japan .................. 62-157990[U]
Oct. 15, 1987 [JP] Japan .................. 62-157991[U]
Jan. 26, 1988 [JP] Japan .................... 63-14993

[51] Int. Cl.$^5$ .................... G06K 7/015; G11B 7/09
[52] U.S. Cl. .................... 235/454; 235/476; 235/494; 235/475; 369/44.26; 369/44.29; 369/44.34
[58] Field of Search ............. 235/475, 476, 454, 487, 235/494; 369/32, 44, 46, 275, 277, 279, 44.26, 44.28, 44.29, 44.34, 44.35, 275.3

[56] References Cited

U.S. PATENT DOCUMENTS

| | | | |
|---|---|---|---|
| 4,592,042 | 5/1986 | Lemelson et al. | 235/475 |
| 4,607,956 | 8/1986 | Ishihara et al. | 369/32 |
| 4,677,602 | 6/1987 | Okano et al. | 369/44.28 |
| 4,697,256 | 9/1987 | Shinkai | 369/44.34 |
| 4,775,966 | 10/1988 | Miura et al. | 369/44.34 |
| 4,800,551 | 1/1989 | Norris | 235/475 |
| 4,819,219 | 4/1989 | Nagano | 369/44.28 |
| 4,835,756 | 5/1989 | Kaku et al. | 369/44.26 |
| 4,837,759 | 6/1989 | Miyazaki et al. | 369/32 |
| 4,868,373 | 9/1989 | Opheij et al. | 235/454 |

FOREIGN PATENT DOCUMENTS

61-39246 2/1986 Japan .
61-158034 7/1986 Japan .

*Primary Examiner*—Stuart S. Levy
*Assistant Examiner*—Robert Weinhardt
*Attorney, Agent, or Firm*—Cooper & Dunham

[57] ABSTRACT

An apparatus for handling an optical card which is generally rectangular in shape and formed with a first plurality of circular, concentric recording tracks and a second plurality of arc-shaped, concentric recording tracks in each of a pair of sectors defined by a pair of hypothetical diagonal lines of the card and located outside of the first plurality of circular, concentric recording tracks. An optical pick-up is moved to a desired track first by a coarse seek operation which uses the difference between a selected count and the count from a linear sensor, and a fine seek operation which uses the sum of a track correspondence voltage and a track error signal.

1 Claim, 7 Drawing Sheets

TRACKING SIGNAL

Fig. 9a  TRACK SIGNAL

Fig. 9b  ROTATING POSITION SIGNAL

Fig. 10

GATE DURING LOADING

ROTATING POSITION BY TRAY MARK

START/STOP OF MOTOR

Fig. 11

GATE DURING CARD DISCHARGE

ROTATING POSITION BY OPTICAL CARD MARK

START/STOP OF MOTOR

SEEK AND TRACK CONTROL FOR A RECTANGULAR OPTICAL CARD HANDLING APPARATUS

BACKGROUND OF THE INVENTION

1. Field of the Invention

This invention generally relates to an apparatus for handling an optical card, which may, for example, be used as a credit card, and more in particular to an optical card handling apparatus for optically recording and reproducing information to and from an optical card generally rectangular in shape.

2. Description of the Prior Art

An optical card has attracted much attention lately for possible applications as credit cards, cash cards or the like. Such an optical card compact in size and light in weight is, for example, disclosed in Japanese Patent Laid-open Publication No. 61-158034, which is hereby incorporated by reference. Such an optical card is generally rectangular in shape and it defines an optical recording medium on which information may be optically recorded and from which recorded information may be optically read. In accordance with the teachings of this Patent Application, however, a light beam is scanned across an optical card by either moving the optical card or an optical pick-up relative to the other in order to record or read information to or from the optical card. In such a system in which scanning is effected due to a linear relative motion between the optical card and the optical pick-up, the overall structure of the optical card handling apparatus tends to become complex and the access speed or recording and/or reproducing speeds tend to be slower.

Even with an optical card rectangular in shape, if a recording track is formed circularly in a manner similar to the recording track typically formed on an optical disc in an optical information recoding and reproducing apparatus using an optical disc as a recording medium and the optical card is supported to be rotatable, it is expected that the access speed and the recording and reproducing speeds are significantly shortened. However, since an optical card is generally rectangular in shape and not circular as in the case of an optical disc, various problems may be encountered in handling such an optical card in a manner similar to an optical disc because of differences in shape. One such problem which may be expected is the manner of positioning an optical card at a loading position properly.

SUMMARY OF THE INVENTION

In accordance with the present invention, there is provided an optical card handling apparatus in which an optical disc is supported to be rotatable around an axis which extends normal to the surface of the optical card so as to provide improvements in access speed as well as recording and reproducing speeds. An optical card is generally rectangular in shape and is formed with recording tracks which are circular and concentric in shape. An optical card handling apparatus constructed in accordance with one embodiment of the present invention includes an optical pick-up, and holding means for holding an optical card rotatably around an axis extending perpendicular to the surface of the optical card, whereby a tracking error signal produced by the optical pick-up is used to produce a card position detection signal for proper positioning of the optical card.

It is therefore a primary object of the present invention to obviate the disadvantages of the prior art as described above and to provide an improved optical card handling apparatus.

Another object of the present invention is to provide an improved optical card handling apparatus in which the optical card is generally rectangular in shape and formed with recording tracks circular and concentric in shape.

A further object of the present invention is to provide an improved optical card handling apparatus having an enhanced access speed as well as recording and reproducing speeds.

A still further object of the present invention is to provide an improved optical card handling apparatus of the card rotating type in which the optical card is set in rotation for recording and reproducing information to and from the card.

A still further object of the present invention is to provide an improved optical card handling apparatus capable of determining a proper relative positional relation between an optical card and an optical pick-up.

Other objects, advantages and novel features of the present invention will become apparent from the following detailed description of the invention when considered in conjunction with the accompanying drawings.

DESCRIPTION OF THE PREFERRED EMBODIMENTS

Figure 4:
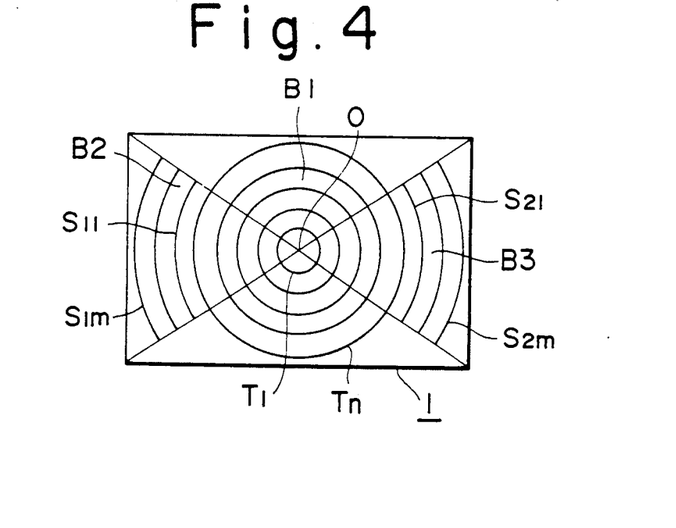
FIG. 4 is a schematic illustration showing a pattern of a recording track formed on one surface of a rectangularly shaped optical card.
Figure 5:
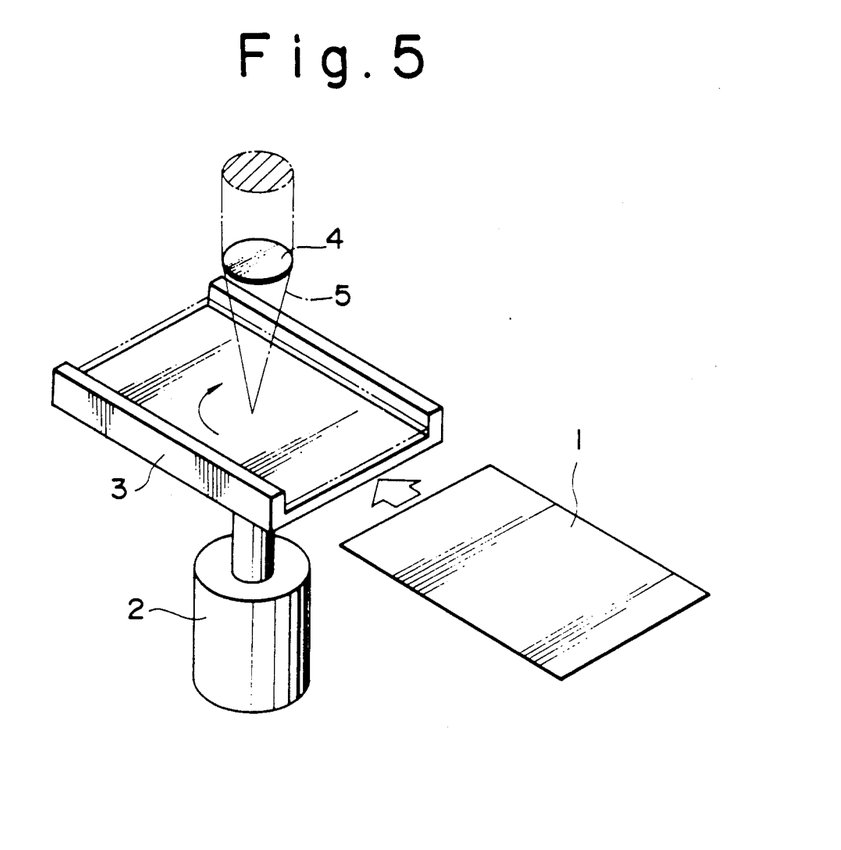
FIG. 5 is a schematic illustration showing in perspective a support structure for supporting an optical card in the optical card handling apparatus of FIG. 1.

Referring first to FIGS. 4 and 5, an optical card 1 for use in an optical card handling apparatus constructed in accordance with one embodiment of the present invention and its support structure will first be described. As shown in FIG. 5, the card support structure includes a spindle motor 2 and a turntable 3 fixedly mounted at the top end of a spindle extending upward from the spindle motor 2. The turntable 3 is so structured to support an optical card 1 thereon and thus the optical card 1 mounted on the turntable 3 may be driven to rotate around a vertical axis which is an extension of the longitudinal center line of the spindle of the spindle motor 2. An optical pick-up 5 includes an objective lens 4 through which a light beam is directed toward the optical card 1 mounted on the turntable 3 and the light reflected by the optical card 1 is collected by the objective lens 4.

Described more in detail with respect to FIG. 5, when the optical card 1 has been inserted into the turntable 3, it is automatically and slidingly moved into a predetermined position in the turntable 3 by means of a loading mechanism (not shown). And, upon reaching the predetermined position, the sliding motion of the card 1 is terminated, and then the card 1 is driven to rotate together with the turntable 3 by means of the spindle motor 2. While the card 1 is in rotation in this manner, information may be written into or information is read from the card 1 by means of the optical pick-up 5 in a manner similar to that employed in the conventional optical disc system. In this manner, by providing a structure for rotating the optical card 1, the access time as well as the recording and reproducing time may be shortened.

Corresponding to such rotation of the card 1, a plurality of recording tracks are formed concentrically on the card 1. Since the card 1 has a rectangular shape, the recording track is formed in the following manner in accordance with a preferred embodiment of the present invention. That is, in the first place, as shown in FIG. 4, a pair of diagonal lines is hypothetically drawn in the rectangular optical card 1, and with the intersection between these diagonal lines as the center, which is also the center of the card 1, a plurality (e.g., n) of recording tracks $T_1$ through $T_n$ are formed concentrically. Since the card 1 is rectangular in shape, the size of the outermost recording track $T_n$ of these concentric recording tracks is limited by the width (or distance between the longer sides) of the card 1. Thus, there remains an extra space between the outermost recording track $T_n$ and each of the shorter sides of the card 1. Under the circumstances, in order to effectively use these extra spaces, a plurality of concentric, arc-shaped recording tracks $S_1$ through $S_m$ are formed in each of fan-shaped sections defined between the two diagonal lines and outside outermost circular recording track $T_n$. With this structure, the outermost circular recording track $T_n$ is the outermost recording track in the widthwise direction of the card 1 and the outermost arc-shaped recording track $S_m$ is the outermost recording track in the longitudinal direction. With this structure, the memory capacity of the optical card 1 can be maximized.

In the above-described card 1, the arc-shaped recording tracks $S_1$ through $S_m$ formed in the left and right sectors are independent from each other, so that the arc-shaped recording tracks in the left sector are indicated by $S_{11}$ through $S_{1m}$ and those in the right sector are indicated by $S_{21}$ through $S_{2m}$. As a result, the recording tracks T and S of the present card 1 are classified into a circular, concentric block B1 and two separate arc-shaped, concentric blocks B2 and B3. Such a division of blocks is effected so as to cope with the situation in which the card 1 is rotated with its center shifted from its ideal location. That is, the optical card 1 is slidingly set into the turntable 3 and held at a predetermined position by optically detecting the position of the card 1, for example, by photodetectors. And, in this case, even if the accuracy of positioning of the card 1 in this case is relatively poor, the particular structure of the card 1 as described above allows to carry out an intended recording and reproducing operation by detecting a desired recording track.

Described more in detail in this respect, in the case where the card 1 rotates with its center shifted from its ideal location, if it is a recording or reproducing operation for any of the recording tracks $T_1$ through $T_n$ belonging to the circular, concentric block B1, since any of the recoding tracks in the block B1 is circular in shape and continuous, an intended recording track may be followed satisfactorily if the dynamic range of the track control is sufficiently larger than the positional discrepancy between the actual center of the card 1 and its ideal location. On the other hand, for an arc-shaped, concentric recording track, it is impossible to trace to the position of Nth recording track $S_{2N}$ in block B3 from the position of Nth recording track $S_{1N}$ in block B2, for example. Assuming that the pitch of recording tracks is 100 microns and the position of the card 1 is shifted toward block B2 over 100 microns, the optical pick-up 5 which traces a particular recording track in block B2 will trace a recording track which is shifted over 20 recording tracks with respect to the corresponding recording track in block B3. In this case, therefore, corresponding recording tracks between blocks B2 and B3 cannot be traced for the rotating card 1.

In the present embodiment, the arc-shaped recording tracks of blocks B2 and B3 are separately handled That is, with the card 1 in rotation, for block B2, recording or reproducing is carried out in the order of recording tracks $S_{11}$, $S_{12}$ . . . , $S_{1N}$, and $S_{1m}$. Upon completion of recording/reproducing for block B2, then recording or reproducing is carried out for block B3 in the order of recording tracks $S_{21}$, $S_{22}$ . . . , $S_{2N}$, and $S_{2m}$. In this manner, the arc-shaped, concentric recording tracks are handled separately between blocks B2 and B3, so that a desired recording track may be selectively controlled without being influenced by the accuracy in positioning of the card 1.

The present embodiment is characterized in the provision of a positioning means for positioning the card 1 when loading the card 1 into the turntable 3. That is, in this embodiment, while using the optical pick-up 5, a recording track signal is converted into a binary card position detecting signal.

Figure 2A:
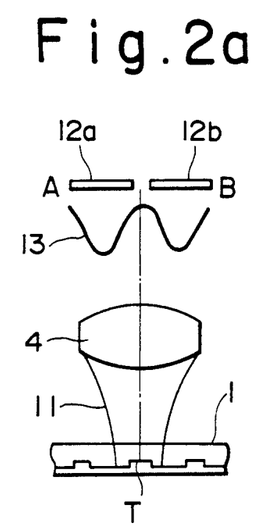
FIGS. 2a and 2b are schematic illustrations which are useful for explaining the principle of detection of a tracking error signal.

In the first place, the principle of detecting a track signal using the optical pick-up 5 will be described with reference to FIGS. 2a and 2b. A plurality of recording tracks T (or S) are formed on an optical card 1 and a laser beam is projected toward the card 1 through the objective lens to form a laser spot 11 on the card 1. A pair of light-receiving elements 12a and 12b is provided as arranged side-by-side on opposite sides of the track for detecting the track. FIG. 2a illustrates the condition in which the laser spot 11 formed by the objective lens 4 impinges upon the recording track T at its center. Under this condition, the laser spot 11 is diffracted symmetrically to the right and to the left by the recording track T so that the diffraction pattern for the pair of light-receiving elements 12a and 12b is symmetrical in shape. As a result, outputs A and B obtained from the pair of light-receiving elements 12a and 12b are equal, so that A=B.

Figure 2B:
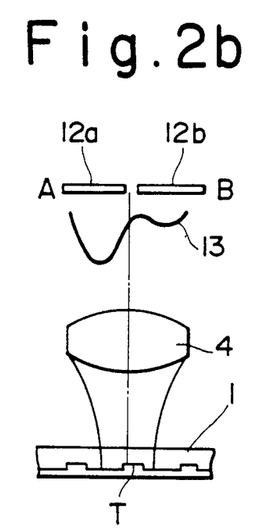

On the other hand, if the laser spot 11 projected by the objective lens 4 is shifted to the left from the center of the recording track T, as shown in FIG. 2b, the diffraction pattern on the pair of light-receiving elements 12a and 12b which receive the light reflected from the card 1 is asymmetrical. As a result, outputs A and B from the pair of light-receiving elements 12a and 12b differ, i.e., A being larger than B in the present example.

Figure 1:
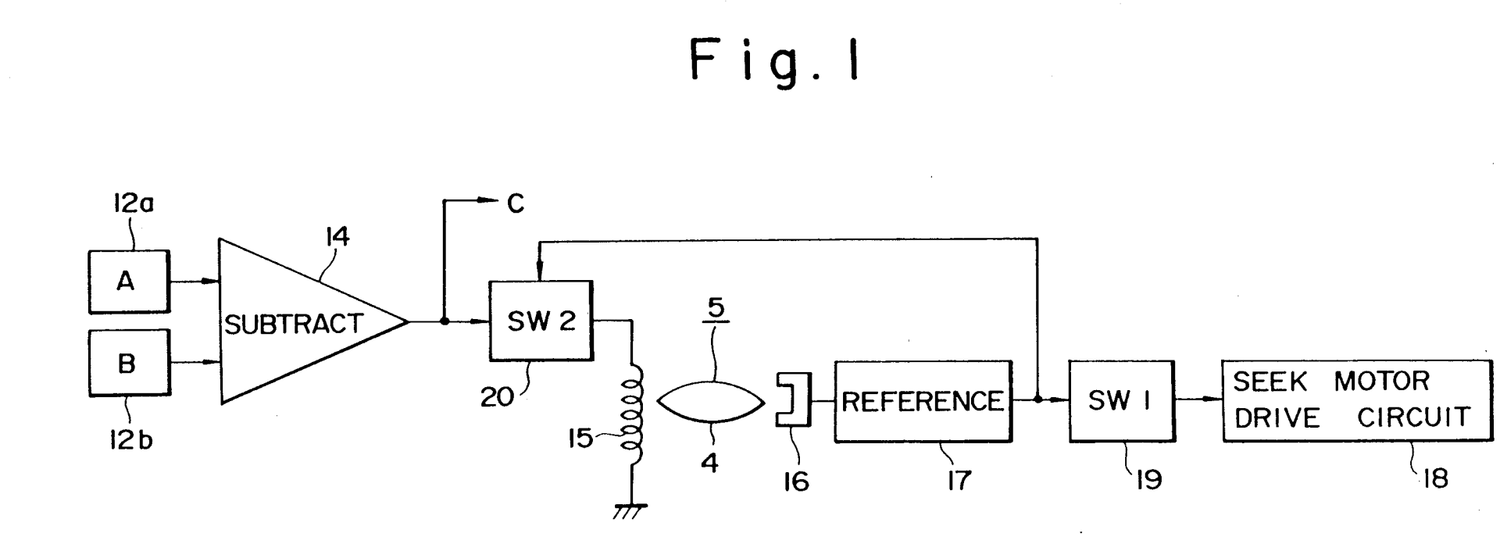
FIG. 1 is a schematic illustration showing an optical card handling apparatus constructed in accordance with one embodiment of the present invention.
Figure 3:
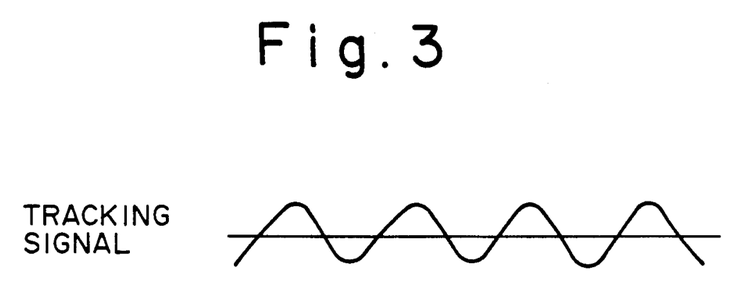
FIG. 3 is an illustration showing a typical tracking (error) signal.

Accordingly, a tracking (error) signal may be obtained by subtracting output B from output A of the pair of light-receiving elements 12a and 12b by a subtractor 14 shown in FIG. 1. And, if this differential signal A−B is not equal to 0, the objective lens 4 is shifted in the tracking direction by a tracking actuator coil 15 so as to obtain the condition of A−B=0. When the optical pick-up 5 is moved in the transverse direction of the recording track of the card 1 with the laser spot 11 projected to the card 1, the differential output A−B from the pair of light-receiving elements 12a and 12b varies as indicated in FIG. 3. In this embodiment, the track (error) signal which is obtained during loading of the card 1 and as shown in FIG. 3 is subjected to a binary valued conversion process to produce a card position detection signal which is used for controlling the positioning of the card 1 at a predetermined position. For example, assuming that the laser spot has a diameter of 5 microns, since the pitch of recording track T is approximately 8 microns, the card 1 can be positioned at a predetermined position highly accurately when use is made of the tracking (error) signal shown in FIG. 3.

For this reason, for the objective lens 4, there is provided a lens position detecting unit 16 for detecting the position of the lens 4. And, a signal from the lens position detecting unit 16 is fed back to a seek motor driving circuit 18 through a reference circuit 17. With this structure, a seek motor for driving the entire optical pick-up 5 in the transverse direction normal to the running direction of the track is subjected to a feed-back control operation, so that the objective lens 4 is subjected to a tracking control operation at a predetermined position. A first switch 19 is provided in a feedback system for the seek motor driving circuit 18, and a second switch 20 is provided in a control system for the tracking actuator 15.

When detecting the position during loading of the card 1, the first switch 19 is controlled to be in its off condition and the seek motor is set in an inoperative condition at a predetermined position, whereby no feedback control is effected. And, the tracking actuator 15 is controlled by a lens position detecting signal from the lens position detecting unit 16 through the second switch 20 to have the objective lens 4 located at a predetermined position. The tracking signal produced from the subtractor 14 during such a card loading operation has a property as shown in FIG. 3, and this signal is converted into a binary signal to thereby define a card position detection signal. As a result, the positional detection of the card 1 can be carried out at the accuracy corresponding to the track pitch.

As described above, in accordance with this aspect of the present invention, since a recording track traversing signal which is detected by the optical pick-up is used for positioning the card during loading of the card into a predetermined position on the turntable as described above, the card can be positioned at a predetermined position at high accuracy without requiring the provision of a special card position detecting mechanism.

Figure 6:
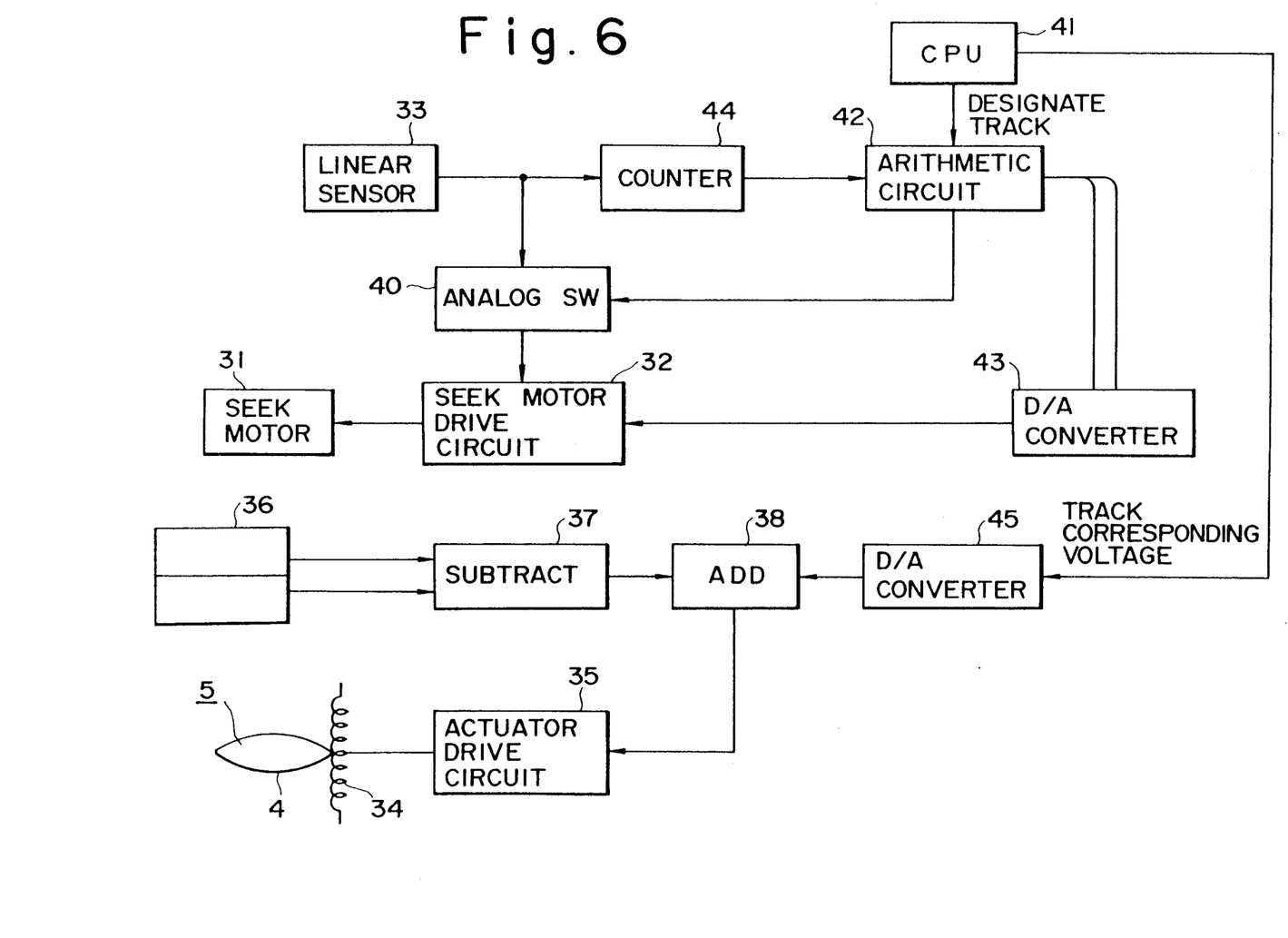
FIG. 6 is a schematic illustration showing an optical card handling apparatus constructed in accordance with another embodiment of the present invention.

Another aspect of the present invention will now be described with reference to FIG. 6. As shown, there is provided an optical card handling apparatus constructed in accordance with another embodiment of the present invention. This apparatus includes a optical pick-up 5 including an objective lens 4 and a seek motor 31 for moving the optical pick-up 5 in a direction normal to the running direction of a recording track of the card 1, or more specifically in the longitudinal direction of the card 1. The seek motor 31 is driven by a seek motor driving circuit 32. Also provided is a linear sensor 33 for detecting the position (condition) of the seek motor 31. The linear sensor 33, for example, has a pitch of 100 microns. If the card 1 has a track pitch of 10 microns, the amount of movement of the linear sensor 33 over 1 pitch corresponds to the amount of movement over 10 tracks. Selection of a recording track is carried out such that a coarse selection is first carried out by the seek motor 31 using the linear sensor 33 as a reference and then a high accuracy tracking is carried out by a tracking servo system which drives the objective lens 4 of the optical pick-up 5.

The tracking servo control system includes a tracking actuator coil 34 for shifting the objective lens in the tracking direction, an actuator drive circuit 35 for appropriately driving the coil 34 based on a servo system signal, a pair of light-receiving elements 36 for receiving the light reflected from the card 1 and outputting a tracking error signal, a subtractor 37 for receiving a differential signal from the pair of light-receiving elements 36 and outputting an error signal, and an adder 38 for summing the signal from the subtractor 37 and a signal from a later-described D/A converter and outputting a servo signal to the actuator drive circuit 35. With this structure, the tracking control is carried out by a feed-back system such that the two outputs from the pair of light-receiving elements become equal and thus the output from the subtractor 37 becomes 0. This is similar in function to the tracking control typically employed in the conventional optical disc recording and reproducing apparatus.

Regarding the seek system, the seek motor drive circuit 32 is controlled by the condition of an analog switch 40 based on a detection signal from the linear sensor 33 and also by a signal from a D/A converter 43 which is controlled by a CPU 41 through an arithmetic circuit 42. The analog switch 40 is also controlled by an output from the arithmetic circuit 42. A signal from the linear sensor 33 is fed into the arithmetic circuit 2 through a counter 44. It is also so structured that a track correspondence voltage signal is output from the CPU 41 to the D/A converter 45. The D/A converter 45 supplies a voltage corresponding to a particular recording track to the seek motor 31.

With this structure, as described before, a seek operation for positioning the optical pick-up 5 to a desired recording track of the card 1 which is mounted in position on the turntable 3 for rotation is carried out. Prior to such a seek operation, it is checked whether the top surface of the card 1 is side A or side B which is opposite to side A. This is, for example, detected by an encoder mounted on the drive motor 2 for controlling the rotation. And, then, the optical pick-up 5 is subjected to a seek motion relative to the card 1 by means of the seek motor 31 to thereby detect a predetermined track as a reference, e.g., first recording track $T_1$ on side A. In this case, the output from the tracking control D/A converter 45 is set to be 0 and the objective lens 4 is set at the center position of the lens drive actuator. With this, a reference track detecting operation is completed.

Next, the position of the linear sensor 33 corresponding to a predetermined recording track as a reference is designated, for example, by the CPU 41 and this information is supplied into the arithmetic circuit 42. In this case, the position of the seek motor 31 by the linear sensor 33 is detected by a count of a counter 44, and if the seek motor 31 is at a position far away from a predetermined position, the output from the arithmetic circuit 42 is large, and a large voltage is supplied to the seek motor 31 (seek motor drive circuit 32) by the D/A converter 43. Thus, the seek motor 31 executes a seek motion at high speed. Upon reaching a predetermined location, the value of the digital input to the D/A converter 43 becomes 0 and the analog switch 40 is turned on, so that a detection output from the linear sensor 33 is directly input into the seek motor drive circuit 32 to thereby have the seek motor 31 halted to produce a holding torque. With this, a coarse seek operation is completed. Then, a tracking control operation is carried out by the tracking control system.

As described before, a selective tracking control for arc-shaped recording tracks S which are not circular and thus not continuous must also be carried out. In the present embodiment, a voltage equivalent to a digital value corresponding to the track pitch is sequentially input into one input terminal of an adder 38 as an analog quantity by a D/A converter 45. In this manner, the tracking actuator coil 34 is controlled and the optical pick-up 5 (objective lens 4) is sequentially shifted to the next adjacent recording track and subjected to a tracking control operation at its position. An output voltage from the D/A converter 45 may be a voltage which is equivalent to one pitch of the linear sensor 33 or to 10 tracks corresponding to 100 microns. That is, by storing a voltage corresponding to the previous recording track by the D/A converter 45 and carrying out a control operation by adding a voltage corresponding to one track when selecting the next recording track, a tracking control operation can be carried out accurately even for an arc-shaped, discontinuous recording track.

Figure 7:
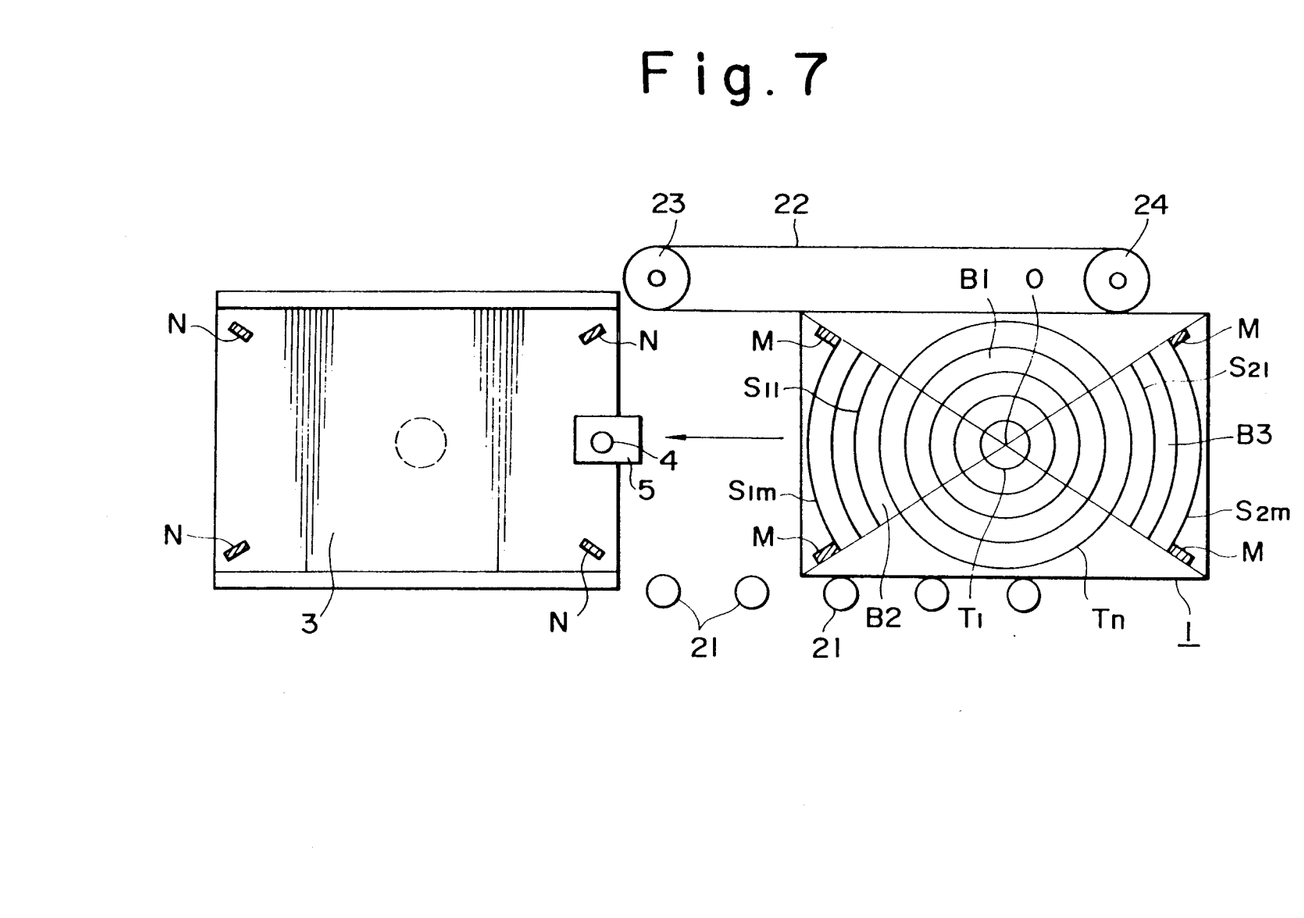
FIG. 7 is a schematic illustration showing an optical card handling apparatus constructed in accordance with a further embodiment of the present invention.

A further aspect of the present invention will now be described. Referring first to FIGS. 5 and 7, there is schematically shown an optical card handling apparatus constructed in accordance with one embodiment of this aspect of the present invention. As shown, the present apparatus includes a spindle motor 2 (FIG. 5) as a means for rotating an optical card 1 which is structurally similar in many respects to the one described previously. A tray or turntable 3 is fixedly attached to the top end of a spindle of the spindle motor 2. The tray 3 on which the card 1 is mounted is driven to rotate by the spindle motor 2 and a light beam is projected onto the card 1 through an objective lens 4 of an optical pick-up 5. As shown in FIG. 5, when the card 1 is inserted into the tray 3 as indicated by the arrow by means of an autoloading mechanism, the card 1 moves on the tray 3 slidingly automatically. And, when the card 1 has arrived at a predetermined position on the tray 3, the sliding motion is terminated, and then the card 1, together with the tray 3, is driven to rotate by the spindle motor 2.

With the card 1 in rotation in this manner, a recording or reproducing operation is carried out for the card 1 using the optical pick-up 5 in a manner similar to that of the typical optical disc recording and reproducing apparatus. Since the card 1 is set in rotation for recording or reproducing information to or from the card 1, there is provided a reduction in access time as well as in recording and reproducing time.

Figure 8:
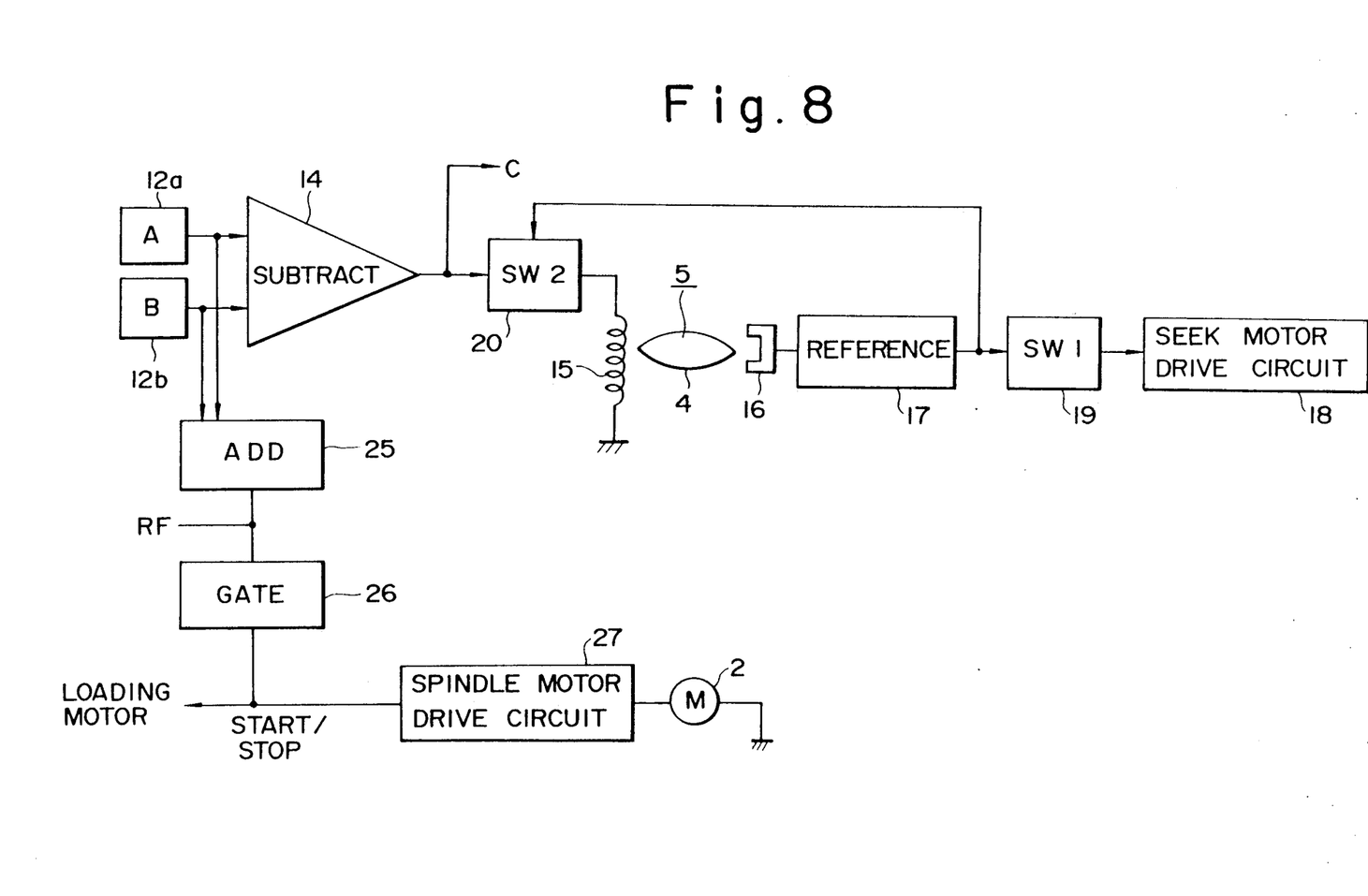
FIG. 8 is a schematic illustration showing in block diagram the control system of the apparatus shown in FIG. 7.

FIG. 8 shows an overall control system of the optical card handling apparatus of FIG. 7 and the control system shown in FIG. 8 has a portion which is similar to the structure shown in FIG. 1, so that the description made with reference to FIG. 1 in the previous embodiment is equally applicable to the present embodiment as far as similarities in structure between FIGS. 1 and 8 are present.

Figure 9A:
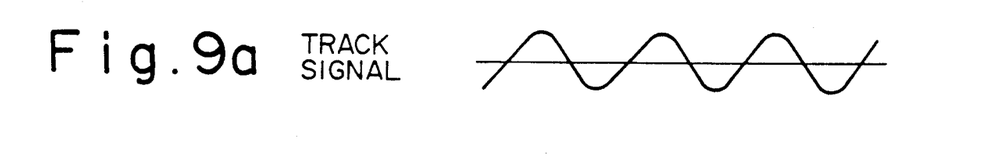
FIGS. 9a and 9b are illustrations showing tracking (error) and rotating position signals which are useful for understanding the operation of the structure shown in FIG. 8.

When the laser spot is irradiated to the card 1 with the optical pick-up 5 moving in the transverse direction of a recording track of the card 1, there is obtained a differential output A−B from the pair of light-receiving elements 12a and 12b, which defines a tracking (error) signal as shown in FIG. 9a. In the present embodiment, the tracking signal which is obtained at the time of loading the card 1 in the form as shown in FIG. 9a is converted into a binary signal which defines a card position detection signal for use in controlling the stop position of the card 1. For example, if the laser spot 11 has a diameter of 5 microns, since the pitch of the recording track T is approximately 8 microns, detection of the position of the card 1 can be carried out at an extremely high accuracy using the tracking signal shown in FIG. 9a.

For this reason, there is provided a lens position detecting unit 16 for detecting the position of the objective lens 4. A signal from the lens position detecting unit 16 is fed back to a seek motor driving circuit 18 through a reference circuit 17. As a result, a feed-back control operation of the seek motor for driving the entire optical pick-up 5 in the direction transverse to the recording track of the card 1 is carried out and the objective lens 4 is subjected to a tracking control operation at a predetermined position. A first switch 19 is provided in a feed-back system for the seek motor drive circuit 18, and a second switch 20 is provided in a control system for the tracking actuator 15. And, the first switch 19 is controlled to be in its off state when position detection is being carried out during loading of the card 1 and on the other hand the seek motor is set inoperative at a predetermined position without any feed-back control. The tracking actuator 15 is controlled by a lens position detection signal from the lens position detecting unit 16 through the second switch 20 to have the objective lens 4 located at a predetermined position. The tracking (error) signal C obtained from the subtractor 14 during such loading is shown in FIG. 9a, and this signal is converted into a binary signal which defines a card position detection signal, so that position detection of the card 1 can be carried out with the accuracy of the track pitch.

Now, an automatic loading system for loading and unloading the card 1 in accordance with the present embodiment will be described below. As shown in FIG. 7, loading and unloading operations of the card 1 to and from the tray 3 are carried out using guide rollers 21 and a timing belt 22. One, e.g., 24, of a pair of pulleys 23 and 24 between which the timing belt 22 is extended is operatively coupled to a loading motor (not shown). The card 1 is formed not only with recording tracks S and T, but also with rotating position detection marks M at predetermined locations on the card 1. In the present embodiment, there are provided four such rotating position detection marks M one at each of the four corners of and along the diagonal lines of the card 1. As an example, the mark M itself may be formed by an aluminum plate or foil having a high reflectance. In the present embodiment, similarly, another set of rotating position detection marks N is provided on the tray 3 one at each of the four corners of and along the diagonal lines of the rectangular tray 3.

As shown in FIG. 8, the control system of the present invention includes an adder 25 for producing a sum of outputs A and B from the pair of light-receiving elements 12a and 12b mounted on the optical pick-up 5, and this sum is supplied through a gate 26 to the loading motor and to the spindle motor 2 through the spindle motor drive circuit 27 to thereby control the motion, such as start or stop, of the card 1.

Figure 9B:
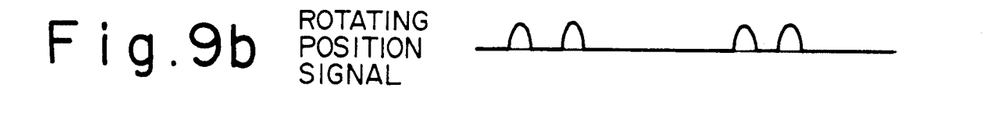

With the above-described structure, a sequence of operation from loading of the card 1 to unloading of the card 1 will now be described. In the first place, when the card 1 is placed in front of a card insertion slot formed at one end of the apparatus, the loading motor is activated to set the timing belt 22 in motion so that the card 1 starts to move into the tray 3 along the guide rollers 21. On the other hand, the spindle motor 2 is also driven so that the tray 3 starts to rotate in a predetermined direction without the card 1 mounted thereon. In this case, since the tray 3 is provided with four rotating position detection marks N one at each corner, these marks N are detected by the optical pick-up 5 one after another. That is, a rotating position detection signal as shown in FIG. 9b is obtained from the adder 25 by summing the outputs A and B from the pair of light-receiving elements 12a and 12b.

Figure 10:
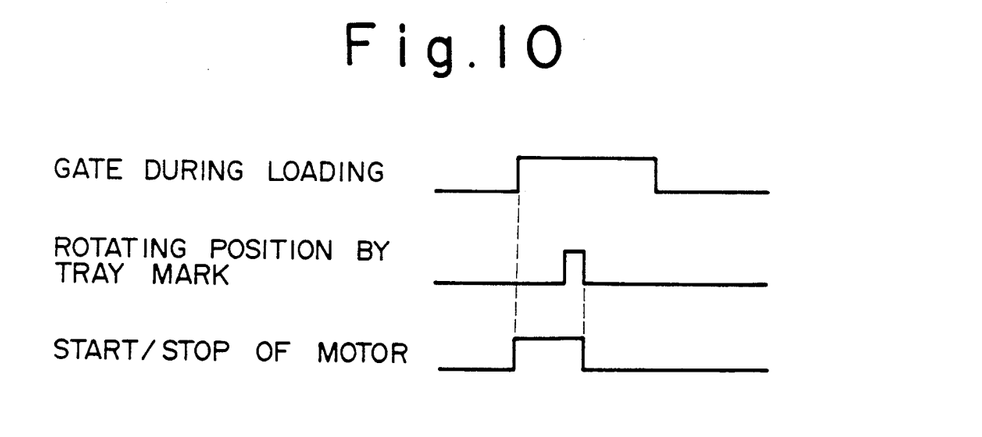
FIG. 10 is a timing chart which is useful for understanding the operation of loading an optical card in the apparatus shown in FIGS. 7 and 8.

During loading, under the condition of controlling the open time of the gate 26 as shown in FIG. 10, the rotation of the spindle motor 2 is halted at the timing when the rotating position of the tray 3 has reached a predetermined position based on detection of mark N of the tray 3, so that the tray 3 is stopped at a position to receive therein the card 1. The tray 3 thus takes the position as shown in FIG. 7. Then, the card 1 is actually loaded into the tray 3. Thus, the card 1 moves into the tray 3 which is held inoperative temporarily. Under this condition, the optical pick-up 5 is now capable of detecting a recording track of the card 1 so that the loading position of the card 1 can be controlled by the before-mentioned recording track transverse signal. That is, the loading motor is driven until the card 1 is located at a predetermined position on the tray 3 while counting the number of outputs of track signals. And, upon reaching a predetermined count corresponding to a predetermined position of the card 1, a position detection signal is output to thereby have the loading motor stopped, so that the automatic loading operation is completed.

Figure 11:
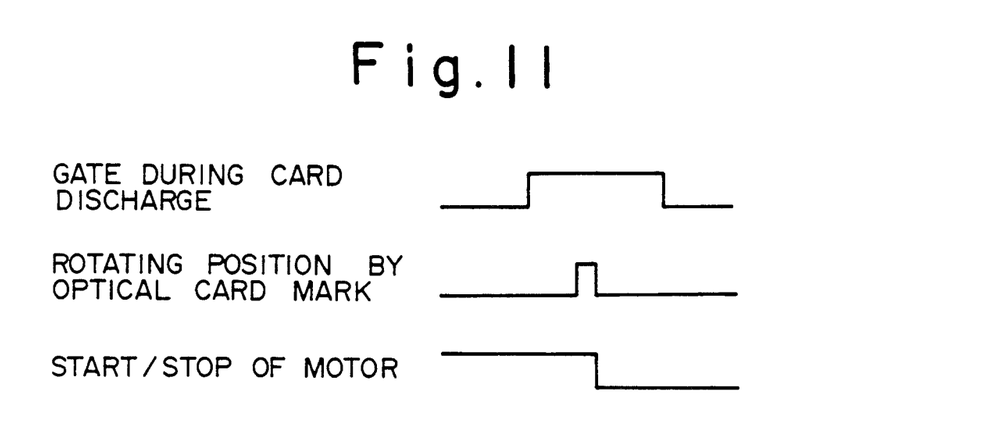
FIG. 11 is a timing chart which is useful for understanding the operation of unloading an optical card from the apparatus shown in FIGS. 7 and 8.

On the other hand, in order to unload the card 1 from the present apparatus, the switch SW1 which is kept on during recording/reproducing operation is turned off, so that the optical pick-up 5 moves to one end of the card 1 by the seek motor and stops there. This is the position where the rotating position detection mark M of the card 1 may be optically read. Then, in a manner similar to that described with respect to detection of the mark N on the tray 3 during loading of the card 1, the mark M on the card 1 is detected by the optical pick-up 5 to thereby detect the rotating position of the card 1 and thus the tray 3. When a predetermined unloading possible position has been detected, the spindle motor 2 is deactivated to stop the rotation of the tray 3. Under this condition, the loading motor is activated to have the card 1 discharged from the tray 3 by the timing belt 22. FIG. 11 illustrates the timing of operation of the spindle motor 2 in this instance.

As described above, in accordance with this aspect of the present invention, the automatic loading/unloading operation of an optical card is carried out while controlling the position of a tray or turn table for mounting thereon the card based on detection of a rotating position detection mark provided on the card and the tray using an optical pick-up. Thus, the automatic loading/unloading operation can be carried out at high accuracy and reliability. In particular, since the rotating position detection mark is provided not only on the card but also on the tray or turn table on which the card is to be mounted, the rotating position of the tray or turn table may be detected accurately even without the card mounted on the tray.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An optical card handling apparatus, comprising:
supporting means for supporting an optical card, wherein said optical card is generally rectangular in shape and is formed with a plurality of recording tracks on a surface thereof;
rotating means for rotating said supporting means to thereby rotate said card around a predetermined axis extending in a direction perpendicular to said surface of said card;
an optical pick-up movable relative to said supporting means in a predetermined direction which is normal to said recording track, said optical pick-up having tracking error detecting light-receiving means generating a tracking error signal;
a seek motor operatively coupled to said optical pick-up for driving said optical pick-up back and forth along said predetermined direction;
first storing means for storing a seek digital value corresponding to a supply voltage for causing the seek motor to drive the pick-up head toward a selected recording track of said card and a seek D/A converter receiving said seek digital value and in response supplying a voltage corresponding to the selected recording track of said card to said seek motor to drive said pick-up toward said selected recording track;
a sensor sensing increments of the movement of the pick-up head toward the selected position, which increments are greater than the track pitch, and providing an output signal related to the sensed increments;

a comparing circuit coupled to the sensor and to the first storing means and responsive to said output of the sensor to generate a halt signal when the increments sensed by the sensor correspond in number to the seek digital value stored in the first storing means;

a switch coupled to the comparing circuit and to the seek motor and responsive to said halt signal to directly couple said output of the sensor to said seek motor to cause said motor to produce a halting torque to halt said seek motor; and second storing means for storing a tracking digital value corresponding to a selected number of tracks, a tracking D/A converter receiving said tracking digital value and in response generating a first tracking signal, an adder adding said first tracking signal and said tracking error signal generated by said tracking error detecting light-receiving means to generate a sum signal, and tracking control means for controlling said optical pick-up depending on said sum signal.

* * * * *